United States Patent
Hall et al.

(10) Patent No.: US 7,091,810 B2
(45) Date of Patent: Aug. 15, 2006

(54) ELEMENT OF AN INDUCTIVE COUPLER

(75) Inventors: David R. Hall, Provo, UT (US); Joe Fox, Spanish Fork, UT (US)

(73) Assignee: IntelliServ, Inc., Provo, UT (US)

( * ) Notice: Subject to any disclaimer, the term of this patent is extended or adjusted under 35 U.S.C. 154(b) by 81 days.

(21) Appl. No.: 10/878,191

(22) Filed: Jun. 28, 2004

(65) Prior Publication Data
US 2005/0285705 A1   Dec. 29, 2005

(51) Int. Cl.
*H01F 21/06* (2006.01)
(52) U.S. Cl. ............... 336/132; 336/216; 336/234
(58) Field of Classification Search ........... 336/132, 336/221, 216, 234; 439/194, 191, 192
See application file for complete search history.

(56) References Cited

U.S. PATENT DOCUMENTS

| | | |
|---|---|---|
| 2,414,719 A | 1/1947 | Cloud |
| 3,518,608 A | 6/1970 | Papadepoulos |
| 4,739,325 A | 4/1988 | MacLeod |
| 4,788,544 A | 11/1988 | Howard |
| 5,486,969 A | 1/1996 | Takeya et al. |
| 6,012,015 A | 1/2000 | Tubel |
| 6,252,518 B1 | 6/2001 | Laborde |
| 6,392,317 B1 | 5/2002 | Hall et al. |
| 6,670,880 B1 | 12/2003 | Hall et al. |
| 6,673,181 B1 | 1/2004 | Berry et al. |
| 6,688,396 B1 | 2/2004 | Floerke et al. |
| 6,717,501 B1 * | 4/2004 | Hall et al. ............ 336/132 |
| 6,799,632 B1 | 10/2004 | Hall et al. |
| 6,821,147 B1 | 11/2004 | Hall et al. |
| 6,830,467 B1 | 12/2004 | Hall et al. |
| 6,844,498 B1 | 1/2005 | Hall et al. |
| 6,866,306 B1 | 3/2005 | Boyle et al. |
| 6,888,473 B1 | 5/2005 | Hall et al. |
| 6,913,093 B1 * | 7/2005 | Hall et al. ............ 175/57 |
| 6,929,493 B1 * | 8/2005 | Hall et al. ............ 439/191 |
| 6,931,713 B1 | 8/2005 | Roshen et al. |
| 6,945,802 B1 | 9/2005 | Hall et al. |
| 2004/0039466 A1 | 2/2004 | Lilly et al. |
| 2004/0104797 A1 | 6/2004 | Hall et al. |
| 2004/0113808 A1 | 6/2004 | Hall et al. |

(Continued)

OTHER PUBLICATIONS

PCT/US03/16475, Published Dec. 4, 2003, Applicant Baker Hughes; International Search Report "Documents Considered to Be Relevant".

*Primary Examiner*—Elvin Enad
(74) *Attorney, Agent, or Firm*—Jeffery E. Daly; Tyson J. Wilde

(57) ABSTRACT

An element for an inductive coupler in a downhole component comprises magnetically conductive material, which is disposed in a recess in annular housing. The magnetically conductive material forms a generally circular trough. The circular trough comprises an outer generally U-shaped surface, an inner generally U-shaped surface, and two generally planar surfaces joining the inner and outer surfaces. The element further comprises pressure relief grooves in at least one of the surfaces of the circular trough. The pressure relief grooves may be scored lines. Preferably the pressure relief grooves are parallel to the magnetic field generated by the magnetically conductive material. The magnetically conductive material is selected from the group consisting of soft iron, ferrite, a nickel iron alloy, a silicon iron alloy, a cobalt iron alloy, and a mu-metal. Preferably, the annular housing is a metal ring.

15 Claims, 5 Drawing Sheets

U.S. PATENT DOCUMENTS

| | | |
|---|---|---|
| 2004/0145492 A1 | 7/2004 | Hall et al. |
| 2004/0150532 A1 | 8/2004 | Hall et al. |
| 2004/0164833 A1 | 8/2004 | Hall et al. |
| 2004/0164838 A1 | 8/2004 | Hall et al. |
| 2004/0216847 A1 | 11/2004 | Hall et al. |
| 2004/0244916 A1 | 12/2004 | Hall et al. |
| 2004/0244964 A1 | 12/2004 | Hall et al. |
| 2004/0246142 A1 | 12/2004 | Hall et al. |
| 2005/0001735 A1 | 1/2005 | Hall et al. |
| 2005/0001736 A1 | 1/2005 | Hall et al. |
| 2005/0001738 A1 | 1/2005 | Hall et al. |
| 2005/0035874 A1 | 2/2005 | Hall et al. |
| 2005/0035875 A1 | 2/2005 | Hall et al. |
| 2005/0035876 A1 | 2/2005 | Hall et al. |
| 2005/0036507 A1 | 2/2005 | Hall et al. |
| 2005/0039912 A1 | 2/2005 | Hall et al. |
| 2005/0045339 A1 | 3/2005 | Hall et al. |
| 2005/0046586 A1 | 3/2005 | Hall et al. |
| 2005/0046590 A1 | 3/2005 | Hall et al. |
| 2005/0067159 A1 | 3/2005 | Hall et al. |
| 2005/0070144 A1 | 3/2005 | Hall et al. |
| 2005/0082092 A1 | 4/2005 | Hall et al. |
| 2005/0092499 A1 | 5/2005 | Hall et al. |
| 2005/0093296 A1 | 5/2005 | Hall et al. |
| 2005/0095827 A1 | 5/2005 | Hall et al. |
| 2005/0115717 A1 | 6/2005 | Hall et al. |
| 2005/0145406 A1 | 7/2005 | Hall et al. |
| 2005/0150653 A1 | 7/2005 | Hall et al. |
| 2005/0161215 A1 | 7/2005 | Hall et al. |
| 2005/0173128 A1 | 8/2005 | Hall et al. |
| 2005/0212530 A1 | 9/2005 | Hall et al. |
| 2005/0238160 A1 | 10/2005 | Hall et al. |

* cited by examiner

ELEMENT OF AN INDUCTIVE COUPLER

FEDERAL SPONSORSHIP

This invention was made with government support under contract number No. DE-FC26-01NT41229 awarded by the Department of Energy. The government has certain rights in this invention.

CROSS REFERENCE TO RELATED APPLICATIONS

None

BACKGROUND

This invention relates to elements for use in inductive couplers for downhole components. U.S. Pat. No. 6,670,880, which is herein incorporated by reference, discloses a downhole transmission system through a string of downhole components. A first transmission element is located in the one end of each downhole component, which includes a first magnetically conducting, electrically-insulating trough, and a first electrically conductive coil lying there in. A second data transmission element is located in the other end, with a similar arrangement comprising a second magnetically conducting, electrically insulating trough and a second electrically conductive coil. The transmission system further comprises an electrical conductor in electrical communication with and running between each first and second coil in the downhole component. The string of downhole components is cooperatively arranged such that the troughs are in magnetic communication with each other and transmit signals through induction.

SUMMARY OF THE INVENTION

An element for an inductive coupler in a downhole component comprises a magnetically conductive trough, which is disposed in a recess in annular housing. The circular trough comprises an outer generally U-shaped surface, an inner generally U-shaped surface, and two generally planar surfaces joining the inner and outer surfaces. The element further comprises pressure relief grooves in at least one of the surfaces of the circular trough. Preferably, the pressure relief grooves are in the outer generally U-shaped surface of the element. The grooves are provided to control the cracking of the magnetically conductive trough. Material, such as ferrite, may crack during the assembly of an inductive coupler. Control crack parallel to a magnetic field is believed to not adversely affect signal transmission between transmission elements.

In the preferred embodiment, an electrically conductive coil is disposed in a trough formed by the inner generally U-shaped surface. As a signal travels around the coil, the magnetically conductive material magnifies the magnetic field created by the electrical signal. The magnified magnetic field may influence a generally circular magnetically conductive trough in an adjacent inductive coupler of an adjacent downhole component. The adjacent generally circular magnetically conductive trough may influence an electrically conducting coil disposed within its trough and an electrical current may be generated.

Disclosed are pressure relief grooves which are scored lines. Preferably the pressure relief grooves are parallel to the magnetic field generated by the magnetically conductive material. In one aspect of the present invention, the element comprises cracks. The cracks may be generally parallel to a magnetic field generated by the magnetically conductive material. It is believed that pressure felt by the element may crack along scored lines. It is also believed that cracks parallel to the magnetic field do not adversely affect the strength of the magnetic field. It is believed that a crack normal to the magnetic field creates a gap with a similar magnetic resistivity as of air, which may weaken the strength of the magnetic field.

The magnetically conductive material may be selected from the group consisting of soft iron, ferrite, a nickel iron alloy, a silicon iron alloy, a cobalt iron alloy, and a mu-metal. In the preferred embodiment the magnetically conductive material is ferrite. Preferably, the magnetically conducting material is also electrically insulating. In one embodiment of the present invention, the generally circular trough of magnetically conductive material is segmented. In another embodiment of the present invention, the generally circular trough of magnetically conductive material is an open-ended ring.

The element may further comprise an electrically insulating filler material. Preferably, the filler material is selected from a group consisting of epoxy, natural rubber, fiberglass, carbon fiber composite, a polymer, polyurethane, silicon, a fluorinated polymer, grease, polytetrafluoroethyene and perfluoroalkoxy, or a combination thereof.

The annular housing may be a metal ring. In one embodiment the annular housing is a steel ring. In another embodiment, the annular housing is a stainless steel ring. Preferably, the annular housing is disposed in a groove formed in the end of the downhole component.

DETAILED DESCRIPTION OF THE PREFERRED EMBODIMENTS

Figure 1:
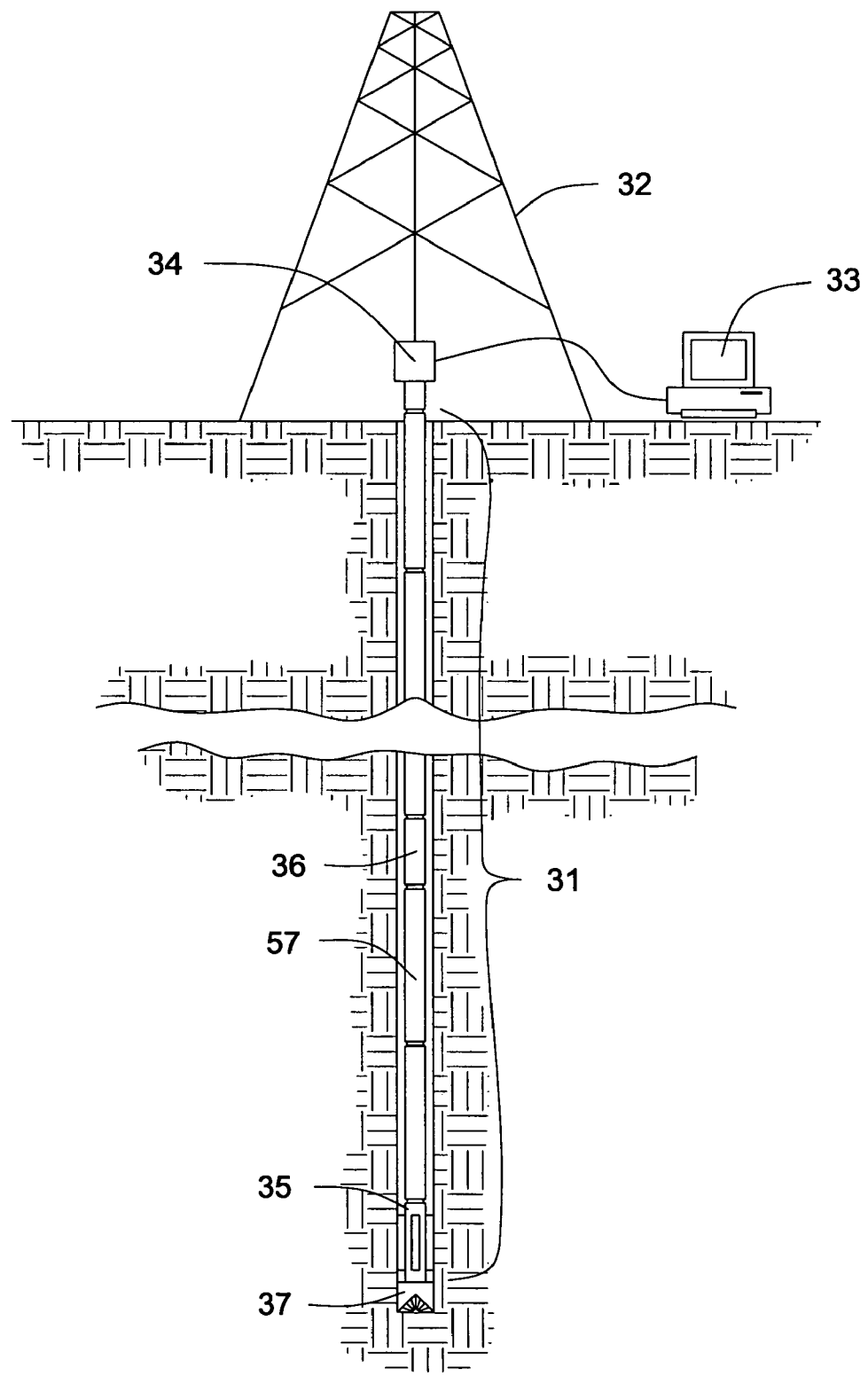
FIG. 1 is a cross sectional view of an embodiment of a downhole tool string.

FIG. 1 shows an embodiment of a downhole tool string 31 suspended in a well bore by a derrick 32. Surface equipment 33, such as a computer, connects to a data swivel 34. The data swivel 34 is adapted to transmit data to and from an integrated transmission network while the downhole tool string 31 is rotating. The integrated transmission network comprises the transmission systems of the individual components 35, 36, 57 of the downhole tool string 31. Preferably the downhole component is a pipe 36, 57. Alternatively the downhole component is a tool 35. Tools 35 may be located in the bottom hole assembly 37 or along the length of the downhole tool string 31. The tools 35 on a bottom hole assembly 37 may be sensors, drill bits, motors, hammers, and steering elements. The tools 35 located along the downhole tool string 31 may be links, jars, seismic sources, seismic receivers, sensors, and other tools that aid in the operations of the downhole tool string 31. Different sensors are useful downhole such as pressure sensors, temperature sensors, inclinometers, thermocouplers, accelerometers, and imaging devices. Preferably the downhole tool string 31 is a drill string. In other embodiments the downhole tool string 31 is part of a production well.

Figure 2:
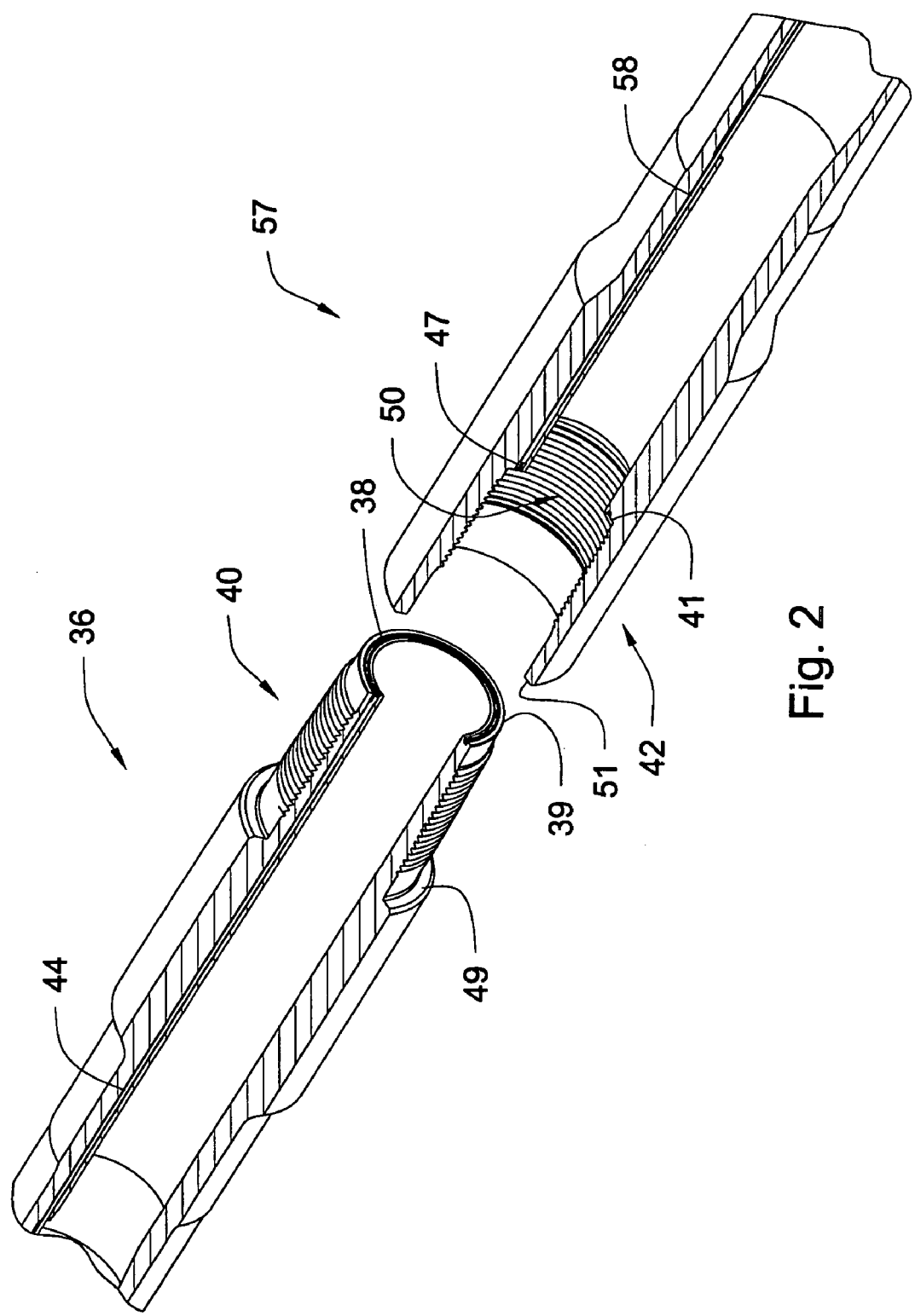
FIG. 2 is a perspective cross sectional view of an embodiment of downhole components.

The downhole tool string 31 is made up of components, as shown in FIG. 2. The components may be pipes 36, 57 or some of the above mentioned tools 35. The components comprise inductive couplers 85 (shown in FIG. 3) located in the secondary shoulder 39 of the pin end 40 and the secondary shoulder 41 of the box end 42 of the component 36. The inductive couplers 85 may comprise an element 38, 47 comprising an annular housing 43. In one embodiment the elements 38, 47 may comprises a plurality of generally linear, magnetically conductive segments, each of which segments includes an outer generally U-shaped surface 88, an inner generally U-shaped surface 80, and planar surfaces 79 (shown in FIG. 5). The surfaces 79, 80, 88 together define a generally linear trough 89 from one end to the other end of each segment. The segments are arranged within the housing recess 86 so as to form a generally circular trough 55.

Preferably the element 38, 47 is disposed in an annular groove 62 formed in the secondary shoulders 39, 41. Preferably the annular housing 43 is a metal ring. The annular housing 43 may be a steel ring. In other embodiment the annular housing 43 is a stainless steel ring. The elements 38, 47, in a single downhole component, are connected by an electrical conductor 44. Preferably the electrical conductor 44 is a coaxial cable. In other embodiments the electrical conductor 44 is a pair of twisted wires. In some embodiments, the electrical conductor 44 is a tri-axial cable.

The circular trough 55 may house an electrically conductive coil 45 encapsulated by the magnetically conductive material. Preferably, the magnetically conductive material is an easily magnetized and easily de-magnetized material selected from the group consisting of soft iron, ferrite, a nickel iron alloy, a silicon iron alloy, a cobalt iron alloy and a mu-metal. More preferably the magnetically conductive material is made of ferrite. The coil 45 comprises one loop of insulated wire. Alternatively, the coil 45 may comprise at least two loops of insulated wire. The wire may be made of copper and is insulated with an insulating layer 73 of a varnish, an enamel, or a polymer. When the components 36, 57 of the downhole tool string 31 up are made, the magnetically conductive trough 38, 47 line up adjacent each other and allow data transmission between the components 36, 57. A threaded portion 48 located between the primary shoulder 49 and secondary shoulder 39 of the pin end 40 and a threaded portion 50 located between the primary shoulder 51 and secondary shoulder 41 of the box end 42 provide a means of attachment for the downhole components 36, 57.

Figure 3:
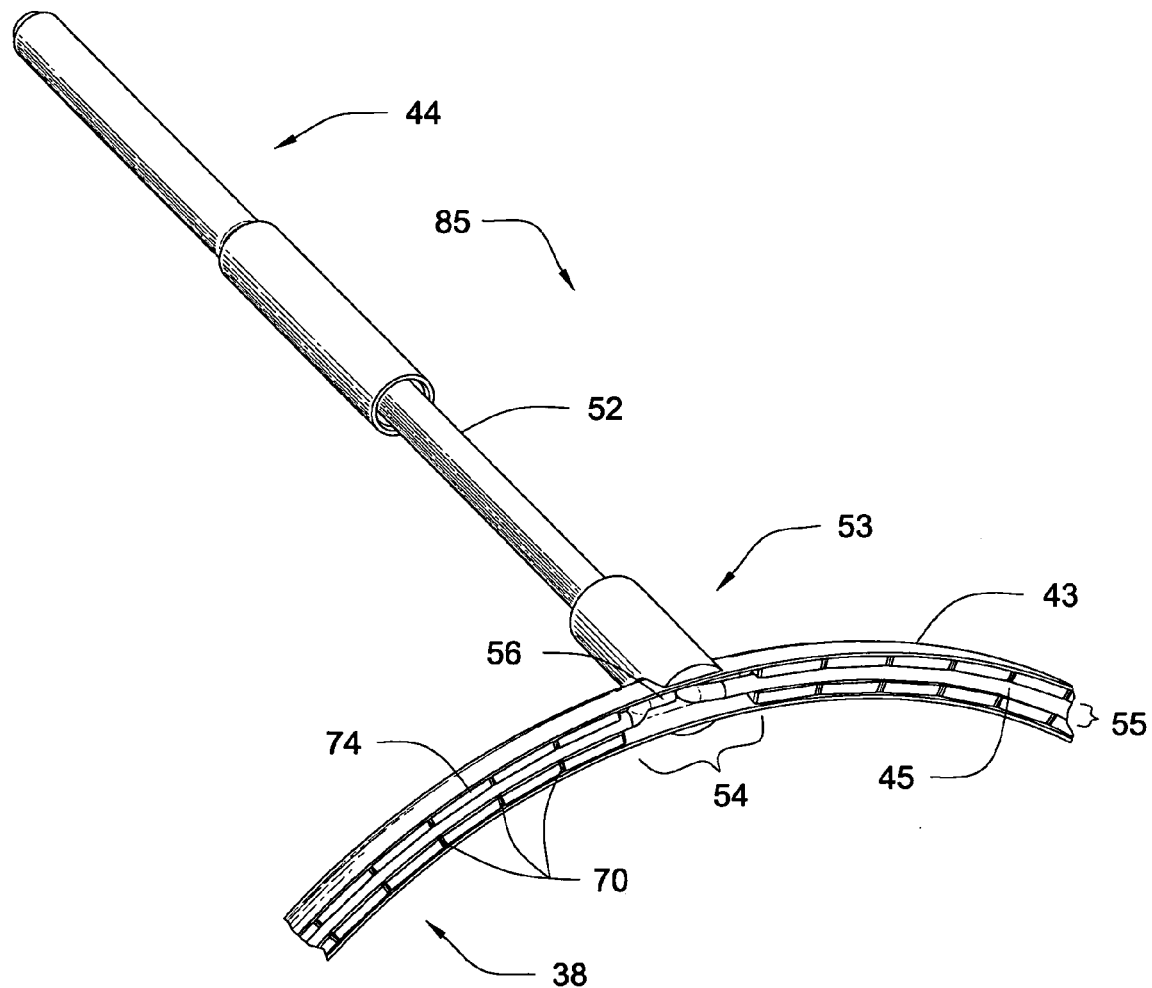
FIG. 3 is a perspective view of an embodiment of an inductive coupler.

FIG. 3 shows a partial perspective of an element comprising an open-ended ring 74 of magnetically conductive material. Pressure relief grooves 70 are scored into the magnetically conductive material. Also illustrated is a connection between the electrical conductor 44 and the electrical conducting coil 45. In the preferred embodiment, a signal travels along the electrical conductor 44 of the downhole component 36. The signal passes from the electrical conductor 44 to a lead wire 52 of the coil 45. The inductive coupler 85 comprises an anti-rotation device 53, which keeps the annular housing 43 from rotating about the axis of the lead wire 52. In the preferred embodiment the lead wire 52 may enter the annular housing 43 through a hole 75 in the annular housing 43, where there is a void 54 of magnetically conductive material. The coil 45 is housed within the magnetically conductive circular trough 55 and is grounded to the annular housing 43 in the void 54 in the magnetically conductive trough. Preferably, the grounded portion 56 of the coil 45 is brazed to the annular housing 43. In some embodiments of the present invention, the element 38, 47 disposed in a groove 62 formed by the secondary shoulders 39, 41 of both the pin end 40 and also in the box end 42 of the downhole component 36. The open-ended ring 74 may be complete when it is installed into the annular housing 43; however, due to strain felt by the element 38, 47 while it is being installed, the magnetically conductive material may crack during installation.

The elements 38, 47 comprise an electrically insulating filler material 60 which holds the circular trough 55 in place. Preferably the filler material 60 is selected from the group consisting of epoxy, natural rubber, fiberglass, carbon fiber composite, a polymer, polyurethane, silicon, a fluorinated polymer, grease, polytetrafluoroethylene and perfluoroalkoxy, or a combination thereof. Polytetrafluoroethylene and perfluoroalkoxy are the more preferred filler materials 60.

It is important that the electrically-insulating filler material 60 will withstand the elevated pressures and temperatures in downhole conditions. Consequently, it is preferred to treat the filler material 60 to make sure that it does not contain any air pockets. Preferably the filler material 60 is centrifuged to remove all bubbles that might be introduced during mixing. One such treatment method involves subjecting the filler material 60 in a centrifuge. A most preferred form of this method subjects the filler material 60 to a centrifuge at between 2500 to 5000 rpm for about 0.5 to 3 minutes.

Figure 4:
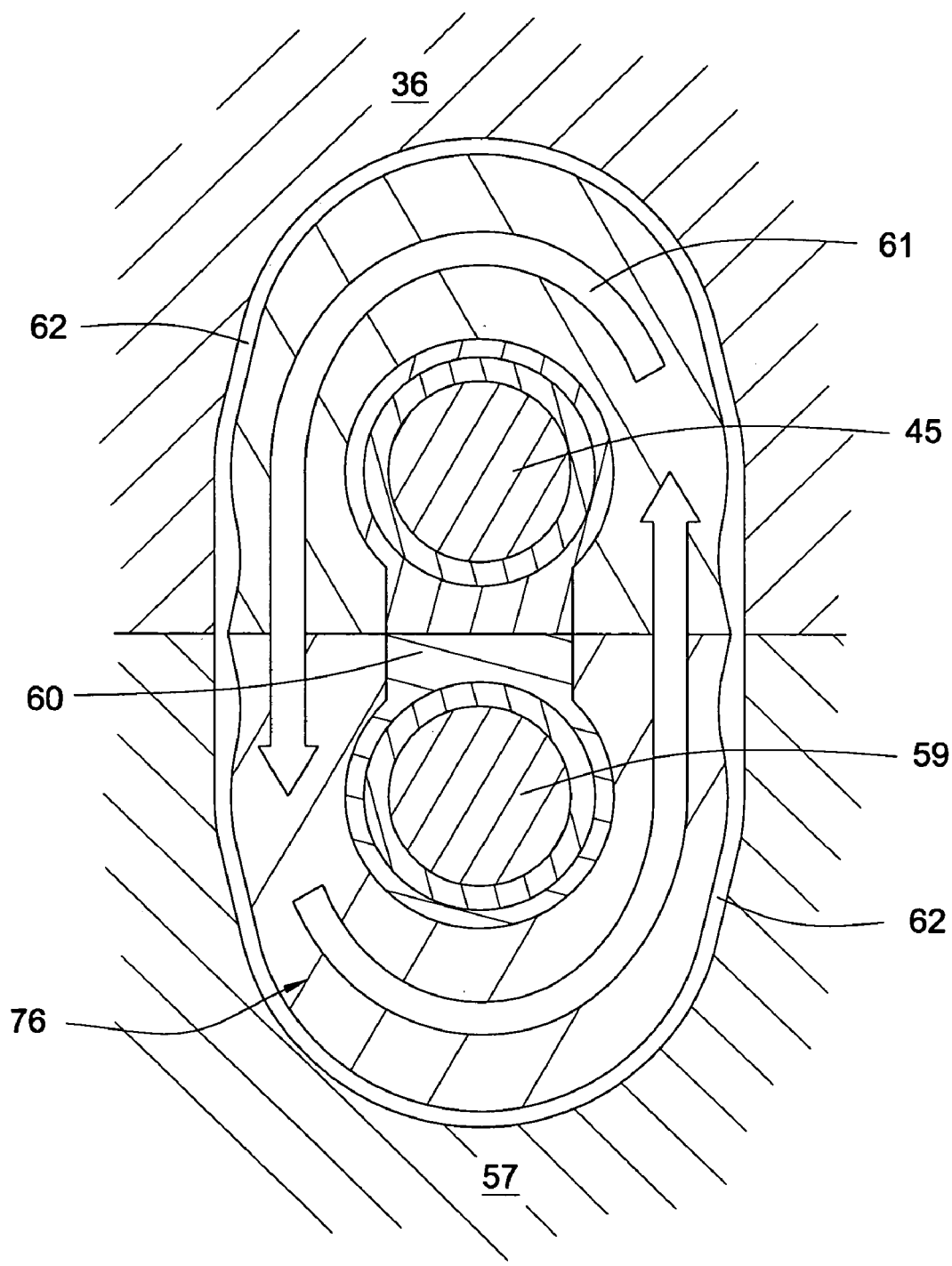
FIG. 4 is a cross-sectional view of an embodiment of a magnetic transmission circuit.

FIG. 4 shows an embodiment of a magnetic transmission circuit 61 formed by cooperating magnetic fields from the element 38 and the adjacent element 47. As the signal travels along the coil 45, the magnetic field from the electrical current is magnified by the magnetically conductive material. The magnified magnetic field influences the magnetically conductive material in the adjacent element 47 in the adjacent downhole component 57. The electrically conducting coils 45, 59 may be arranged in a manner to allow the magnetic fields to generate the magnetic transmission circuit 61. The magnetic transmission circuit 61 may be allowed by disposing one coil 45 in a clockwise direction in the circular trough 55 of magnetically conducting material and disposing an adjacent coil 59 in a counterclockwise direction in an adjacent circular trough 76 of magnetically conductive material. The coil 59 in the adjacent element 47 is influenced by the magnetic transmission circuit 61 to generate an electrical current and that signal is passed to the electrical conductor 58 in the adjacent downhole component 57.

Figure 5:
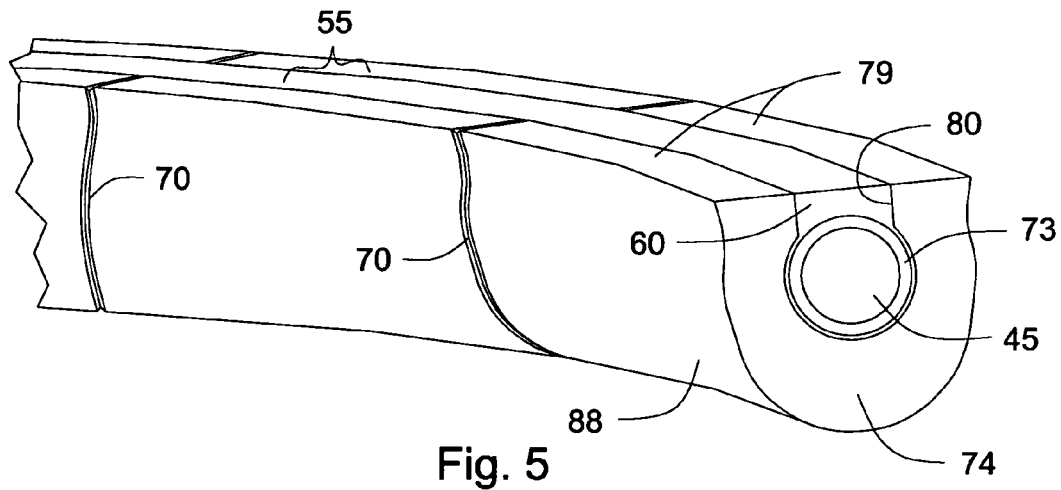
FIG. 5 is a partial perspective view of an embodiment of an element.

A partial perspective view of an embodiment of the element is shown in FIG. 5. The coil 45 is encapsulated by an open-ended ring 74 of magnetically conductive material within the generally circular trough 55 formed by the inner generally U-shaped surface 80. A pressure relief groove 70 is formed in the outer generally U-shaped surface 88. In some embodiments the pressure relief groove 70 may be formed in the inner generally U-shaped surface 80 or in at least one of the planar surfaces 79. In the preferred embodiment the pressure relief groove 70 is a scored line.

Figure 6:
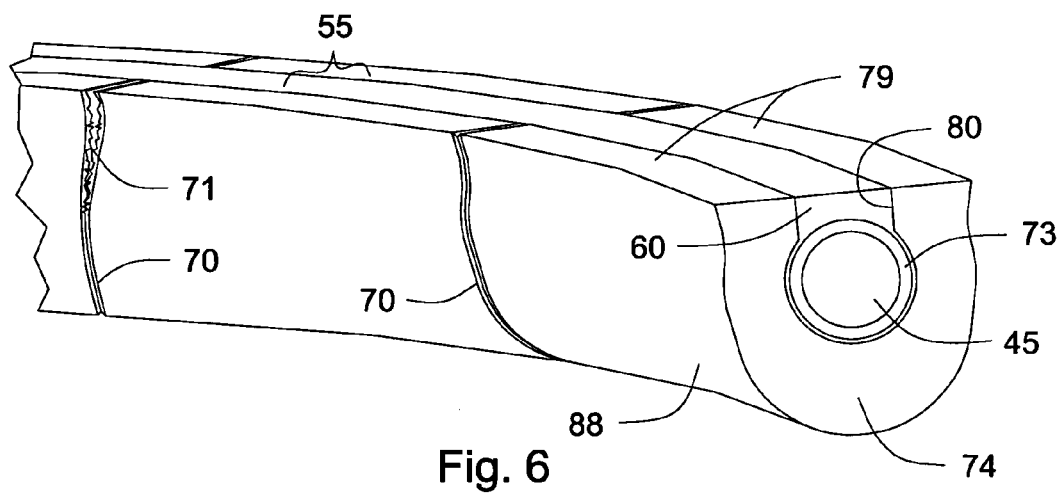
FIG. 6 is a partial perspective view of an embodiment of an element.
Figure 7:
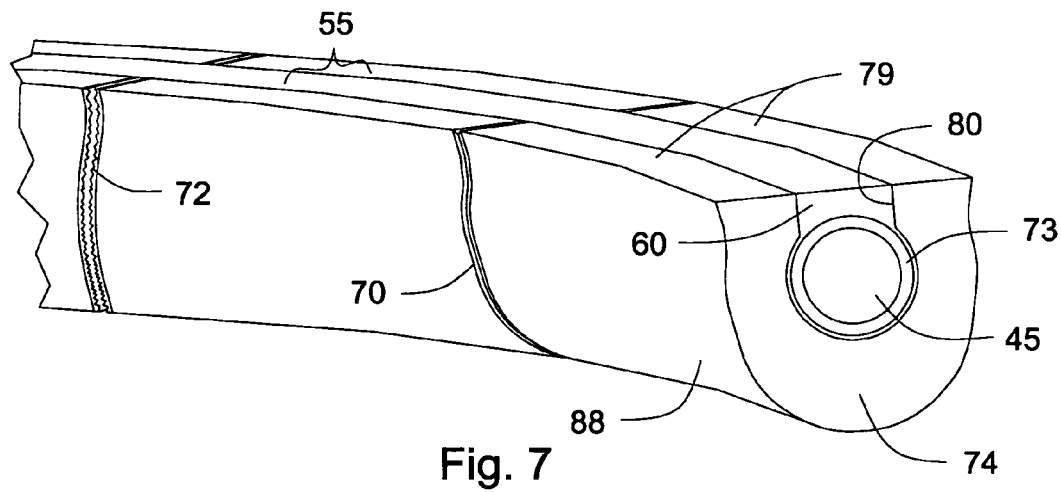
FIG. 7 is a partial perspective view of an embodiment of an element.

It is believed that a crack normal to the magnetic field may adversely affect the magnetic transmission circuit 61. It is believed that the crack may have a similar magnetic resistance as air. It is further believed that an area in the magnetic transmission circuit 61 which has a similar magnetic resistance as air may weaken the strength of the entire magnetic transmission circuit 61. A pressure relief groove 70 is believed to control the cracking along the groove 70. It is preferred that pressure relief grooves 70 are parallel to the direction of the magnetic fields. It is believed that cracks controlled by the pressure relief grooves that are formed parallel to the direction of the magnetic fields may not adversely affect the magnetic transmission circuit 61. FIG. 6 shows an embodiment of an element 38 with a partial crack 71 controlled by the pressure relief groove 70. FIG. 7 shows an embodiment of an element 38 with a crack 72 that separates the magnetically conductive material.

A preferred method of forming an element 38, 47 of magnetically conductive material begins with providing a mold having a trough conforming to the final dimensions of the circular trough 55. A two-part, heat-curable epoxy formulation is mixed in a centrifuge cup, to which the magnetically conductive material and a length of fiberglass rope are added. The parts are centrifuged for up to 30 minutes to cause all bubbles induced by mixing to rise out of the viscous liquid, and to cause the liquid to penetrate and seal any porosity in the magnetically conductive material. The fiberglass rope is then laid in the bottom of the mold, which is either made from a material, which does not bind to epoxy, such as polymerized tetrafluroethane or which is coated with a mold release agent. The magnetically conductive material is then placed on top of the fiberglass rope, to fill the mold. Any excess epoxy is wiped out of the groove. The planar surfaces 79 of the magnetically conductive material may be precisely aligned by holding it in position with magnets placed around the circular trough in the mold. After the epoxy is cured, either at room temperature or in an oven, the circular tough 46 is removed from the mold. Preferably, lines are scored into the outer generally U-shaped surface, before the element 38, 47 is place in the annular housing 43 or into the annular groove 62 formed in the end of the downhole component 36, 57.

The description above and the attached figures are meant to illustrate specific embodiments of the present invention and not limit its scope. Those having ordinary skill in the art will appreciate that other embodiments will fall within the scope and spirit of the invention as defined in the appended claims.

What is claimed is:

1. An element for an inductive coupler in a downhole component comprising: magnetically conductive material disposed in a recess in annular housing; the magnetically conductive material forming a generally circular trough; the circular trough comprising an outer generally U-shaped surface, an inner generally U-shaped surface, and two generally planar surfaces joining the inner and outer surfaces; and pressure relief grooves in at least one of the surfaces of the circular trough wherein the pressure relief grooves are scored lines.

2. The element of claim 1 wherein the magnetically conductive material is selected from the group consisting of soft iron, ferrite, a nickel iron alloy, a silicon iron alloy, a cobalt iron alloy, and a mu-metal.

3. The element of claim 1 wherein the annular housing is a metal ring.

4. The element of claim 1 wherein the annular housing is disposed in a groove formed in the end of a downhole component.

5. The element of claim 1 wherein the element comprises an electrically insulating filler material.

6. The element of claim 5 wherein the filler material is selected from a group consisting of epoxy, natural rubber, fiberglass, carbon fiber composite, a polymer, polyurethane, silicon, a fluorinated polymer, grease, polytetrafluoroethyene and perfluoroalkoxy, or a combination thereof.

7. The element of claim 1 wherein the pressure relief grooves are generally parallel to the magnetic field generated by the magnetic conductive material.

8. The element of claim 1 wherein the generally circular trough is segmented.

9. The element of claim 1 wherein the generally circular trough is an open-ended ring.

10. The element of claim 1 wherein the generally circular trough comprises cracks.

11. The element of claim 10 wherein the cracks are generally parallel to a magnetic field generated by the magnetically conductive material.

12. An element for an inductive coupler in a downhole component comprising: magnetically conductive material disposed in a recess in annular housing; the magnetically conductive material forming a generally circular trough; the circular trough comprising an outer generally U-shaped surface, an inner generally U-shaped surface, and two planar surfaces joining the inner and outer surfaces; and scored lines generally parallel to the magnetic field generated by the magnetic conductive material in at least one of the surfaces of the circular trough.

13. The element of claim 12 wherein the magnetically conductive material comprises ferrite.

14. The element of claim 12 wherein the generally circular trough comprises cracks.

15. The element of claim 12 wherein the cracks are generally parallel to a magnetic field generated by the magnetically conductive material.

* * * * *